United States Patent
Chang

(10) Patent No.: US 8,279,190 B2
(45) Date of Patent: Oct. 2, 2012

(54) FILTER FOR REMOVING DC SIGNAL AND HIGH FREQUENCY NOISE AND METHOD THEREOF FOR TOUCH SENSOR

(75) Inventor: Yaw-Guang Chang, Sinshih Township, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 332 days.

(21) Appl. No.: 12/830,002

(22) Filed: Jul. 2, 2010

(65) Prior Publication Data

US 2012/0001857 A1    Jan. 5, 2012

(51) Int. Cl.
*G06F 3/041* (2006.01)
(52) U.S. Cl. ...................... 345/173; 178/20.02
(58) Field of Classification Search .......... 345/173–178; 178/18.01–20.04
See application file for complete search history.

(56) References Cited

U.S. PATENT DOCUMENTS

| | | | | |
|---|---|---|---|---|
| 5,949,257 | A * | 9/1999 | Ishikawa | 327/72 |
| 7,511,910 | B1 * | 3/2009 | Han | 360/65 |
| 8,031,094 | B2 * | 10/2011 | Hotelling et al. | 341/143 |
| 2002/0093491 | A1 * | 7/2002 | Gillespie et al. | 345/173 |
| 2003/0112228 | A1 * | 6/2003 | Gillespie et al. | 345/173 |
| 2003/0145121 | A1 * | 7/2003 | Watkins | 709/250 |
| 2006/0164374 | A1 * | 7/2006 | Chang et al. | 345/100 |
| 2009/0002343 | A1 * | 1/2009 | Land et al. | 345/178 |
| 2009/0153519 | A1 * | 6/2009 | Suarez Rovere | 345/173 |
| 2010/0066442 | A1 * | 3/2010 | Mu | 327/553 |
| 2010/0150366 | A1 * | 6/2010 | Davidson et al. | 381/71.1 |
| 2010/0328255 | A1 * | 12/2010 | Ishizaki et al. | 345/174 |
| 2011/0061948 | A1 * | 3/2011 | Krah et al. | 178/18.01 |
| 2011/0063227 | A1 * | 3/2011 | Wu et al. | 345/173 |

* cited by examiner

*Primary Examiner* — Joe H Cheng
(74) *Attorney, Agent, or Firm* — Thomas|Kayden

(57) ABSTRACT

A filtering system, adapted to remove a direct current (DC) component and a high frequency noise component of a touch-sensed signal is provided. The filtering system includes: an analog to digital converter for transforming the touch-sensed signal into a discrete-time input signal; a direct current removing unit for removing direct current components of the discrete-time input signal to obtain a differentiated signal; a de-noise unit for removing noise components of the differentiated signal to obtain a de-noise signal; and a reconstructive unit for processing the de-noise signal to obtain an output signal.

20 Claims, 8 Drawing Sheets

US 8,279,190 B2

FILTER FOR REMOVING DC SIGNAL AND HIGH FREQUENCY NOISE AND METHOD THEREOF FOR TOUCH SENSOR

FIELD OF THE INVENTION

The present invention relates to a filter for a touch sensor and in particular relates to a filter for removing DC signal and high frequency noise and method thereof for a touch sensor.

DESCRIPTION OF THE RELATED ART

Touch sensitive control devices are now prevalent in many electronic devices such as mobile phones, MP3 players and personal digital assistants etc. Touch sensitive control devices can be disposed in front of a display screen such as an LCD display screen, so that a user can select a particular function by touching the screen at a position at which a particular menu option has been displayed.

There are various forms of touch sensitive control devices which use capacitive sensors to sense the presence of an anatomical part of a body such as a finger. Although touch sensitive capacitive sensors have been successfully applied in many devices, some devices, during certain circumstances, may have difficulty in detecting changes in electrical charges for sensing an anatomical part of a body. For example, noise, which may be present in a device, can disrupt the measuring accuracy for charge amounts at a capacitive charge key.

Conventionally, a liquid crystal display (LCD) has switching noises when switching and refreshing pixels. Other types of displays may have other type of noises when scanning and refreshing pixels.

Prior art capacitive sensors adopt a variety of signal processing techniques to filter noise from acquired signals. In principle, standard filters may be used, such as slew rate filters, high frequency pass filters, low frequency pass filters and band pass filters.

It is desirable to tailor filtering techniques based upon noise strength. For example, it may be desirable to switch certain filters on and off depending on the amount and characteristics of noise, or to set filtering parameters based upon noise conditions.

Thus, a filter for a capacitor touch sensor for removing undesired DC components and noises such as specified high frequency glitches is called for.

BRIEF SUMMARY OF INVENTION

A detailed description is given in the following embodiments with reference to the accompanying drawings.

The present invention provides a filtering system, adapted to remove a direct current (DC) component and a high frequency noise component of a touch-sensed signal, comprising: an analog to digital converter for transforming the touch-sensed signal into a discrete-time input signal; a direct current removing unit for removing direct current components of the discrete-time input signal to obtain a differentiated signal; a de-noise unit for removing noise components of the differentiated signal to obtain a de-noise signal; and a reconstructive unit for processing the de-noise signal to obtain an output signal.

The present invention provides a method for filtering, adapted to remove a direct current (DC) component and a high frequency noise component of a touch-sensed signal, comprising: transforming the touch-sensed signal into a discrete-time input signal by an analog to digital converter; removing direct current components of the discrete-time input signal to obtain a differentiated signal by a direct current removing unit; removing noise components of the differentiated signal to obtain a de-noise signal by a de-noise unit; and processing the de-noise signal to obtain an output signal by a constructive unit.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
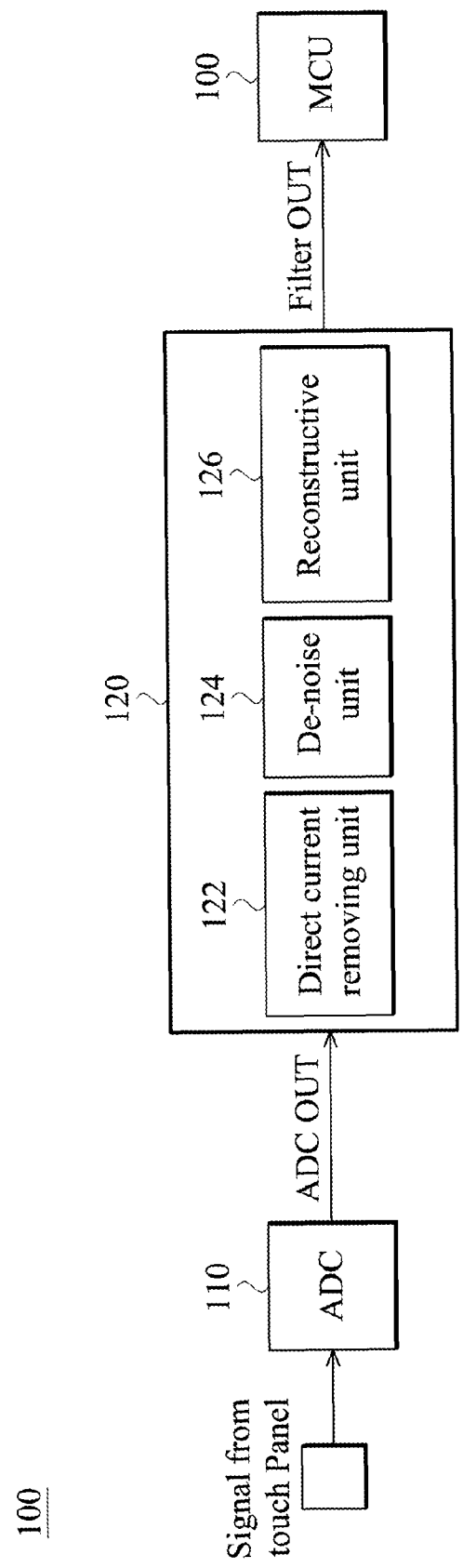
FIG. 1 is a schematic diagram showing a filtering system of the invention.

FIG. 1 is a schematic diagram showing a filtering system of the invention. The filtering system 100 includes an analog to digital converter 110, and a digital signal processing unit 120 having a direct current removing unit 122, a de-noise unit 124 and a reconstructive unit 126. The digital signal processing unit 120 may be a digital signal processor, but is not limited thereto.

Figure 2:
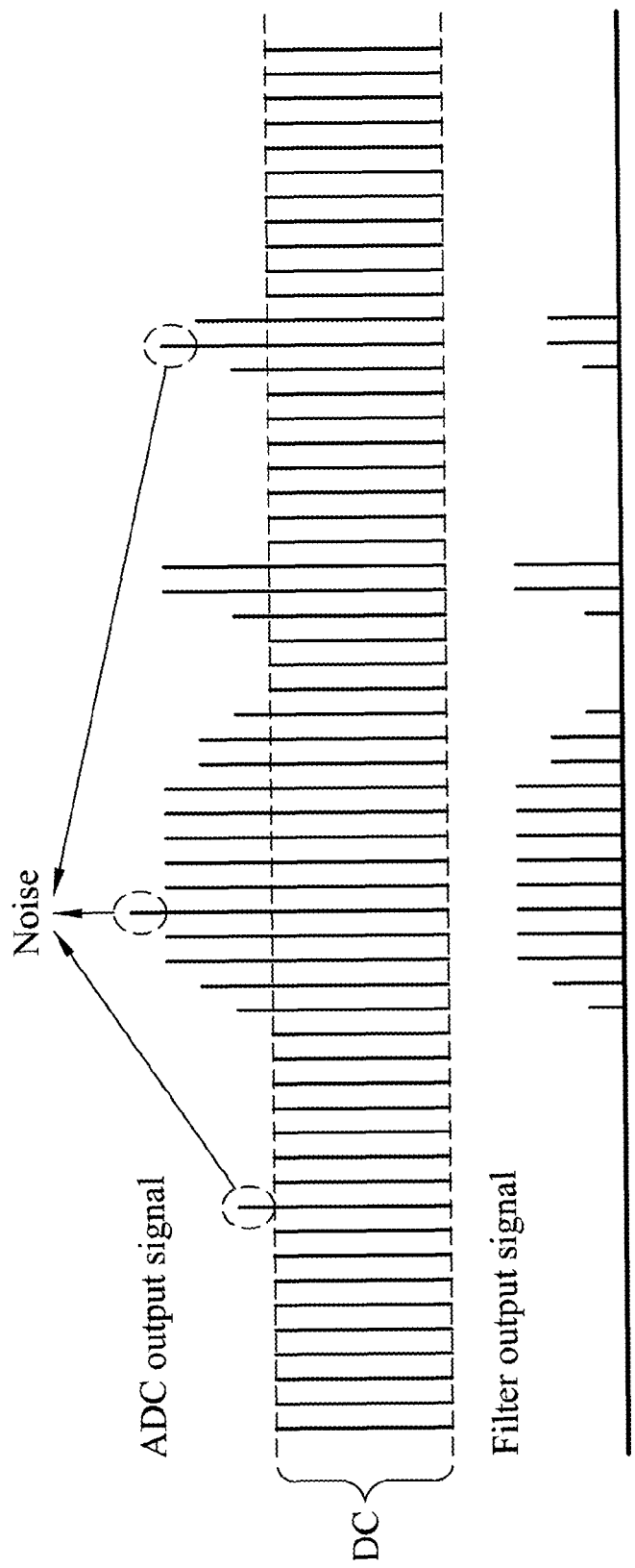
FIG. 2 is a discrete-time waveform graph illustrating a digital input waveform and a digital output waveform of the filtering system of the invention.

FIG. 2 is a discrete-time waveform graph illustrating a digital input waveform and a digital output waveform of the filtering system of the invention. Refer to FIG. 1, a signal from a touch panel is an analog signal sensed by a touch sensor and is called a touch-sensed signal. The touch-sensed signal is converted into a digital signal by the analog to digital converter 110. The digital signal is the ADC output signal shown in FIG. 2, which is a discrete-time signal. The ADC output signal may include noise components which affect signal quality or DC components which are not a critical portion of the ADC output signal and occupy an enormous amount of storage area of the filtering system. The digital signal processing unit 120 must filter the components out from ADC output signal. The filter output signal shown in FIG. 2 is a clean signal without DC components and noise components. The clean signal, which clearly shows a touch-sensed status, is helpful for the MCU (micro control unit) to carry out subsequent processes.

Figure 3:
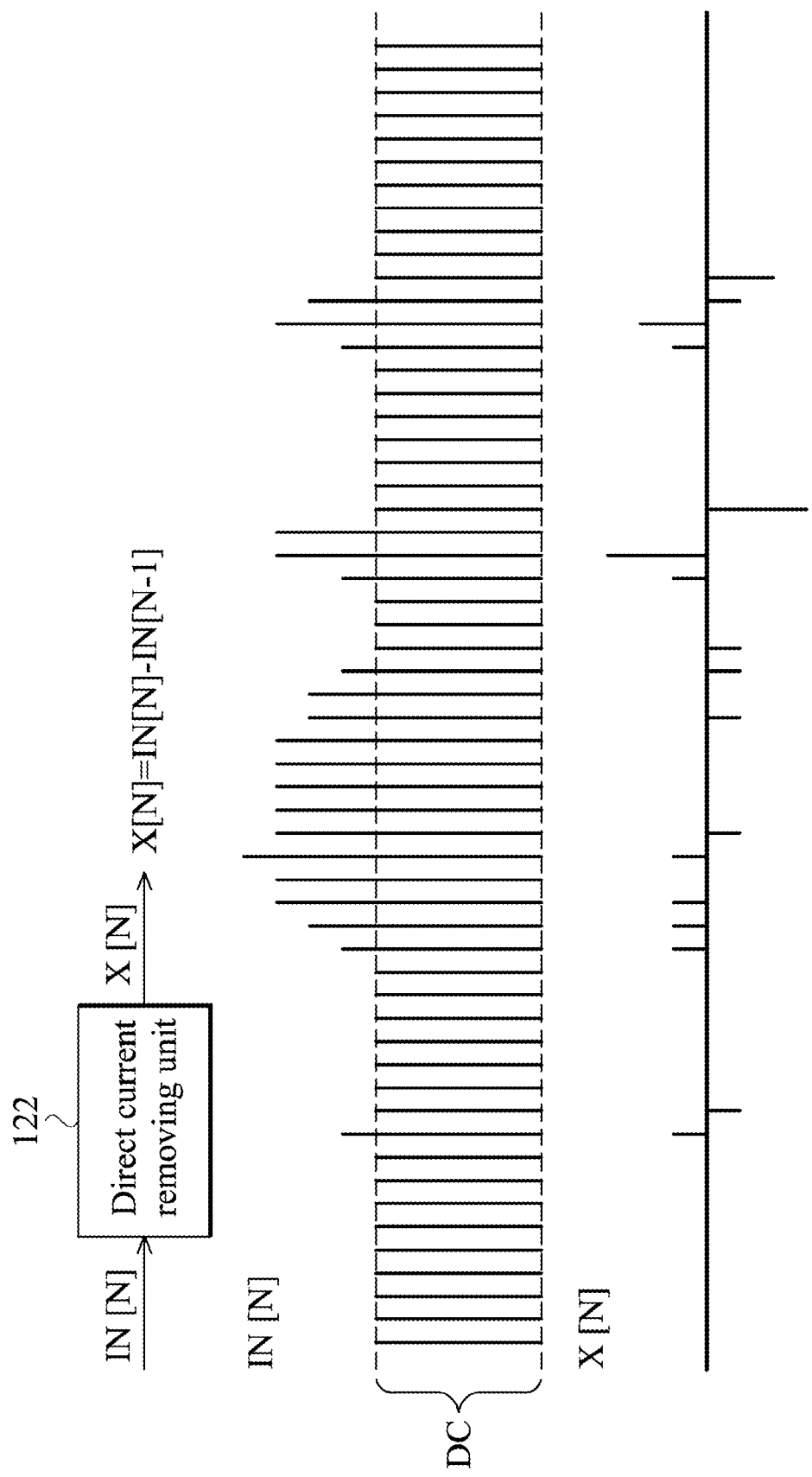
FIG. 3 is a discrete-time waveform graph illustrating a digital input waveform and a digital output waveform of the direct current removing unit of the filtering system of the invention according to a direct current removing method.

FIG. 3 is a discrete-time waveform graph illustrating a digital input waveform and a digital output waveform of the direct current removing unit of the filtering system of the invention according to a direct current removing method. The DC removing unit is used to remove direct current components of the discrete-time ADC output signal or a discrete-time input signal IN[N]. In one embodiment, a differential method is utilized to remove the DC components. The differential method subtracts a previous sample of the input signal at a previous sampling time from a present sample of the input signal at a present sampling time. The method may be expressed as a equation:

$$X[N]=IN[N]-IN[N-1],$$

where X[N] is the differentiated signal at sampling time N, and IN[N] is the discrete-time input signal at sampling time N. As FIG. 3 shows, the waveform of the differentiated signal X[N] is a discrete-time signal without a DC component.

Figure 4:
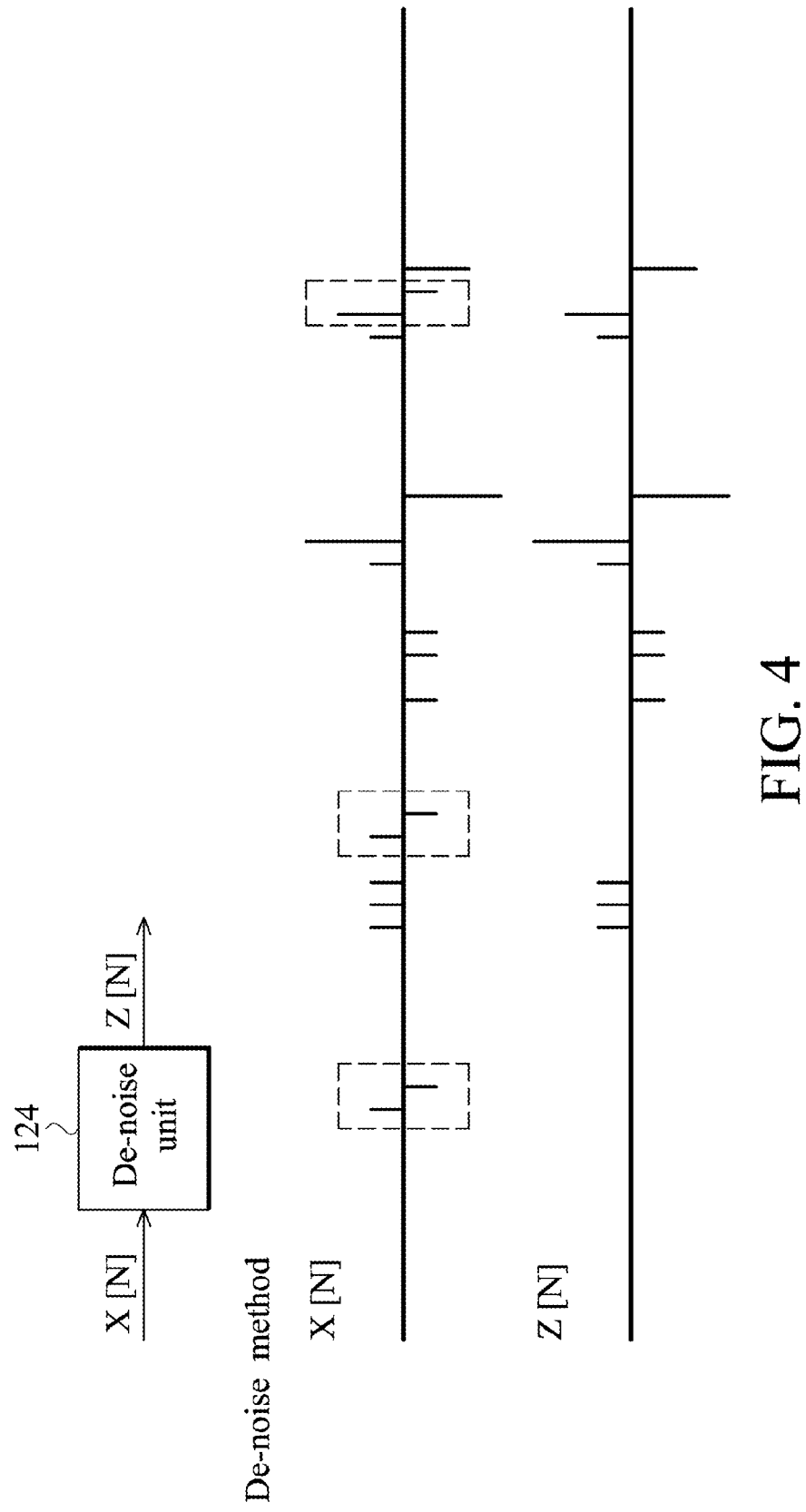
FIG. 4 is a discrete-time waveform graph illustrating a digital input waveform and a digital output waveform of the de-noise unit of the filtering system of the invention according to a de-noise method.

FIG. 4 is a discrete-time waveform graph illustrating a digital input waveform and a digital output waveform of the de-noise unit of the filtering system of the invention according to a de-noise method. The de-noise unit is used to remove high frequency noise of the differentiated signal X[N]. In one embodiment, a de-noise method is utilized to remove high frequency noise. The high frequency noises are defined as unexpected glitches attached to a stable signal. The concept of the de-noise method is to nullify or shrink a first differentiated signal sample at a current sampling time and a second sample of the differentiated signal at a following sampling time when the first sample is opposite to the second sample. As FIG. 4 shows, the pairs of samples which are opposite in voltage level are cancelled among another. After that, the de-noise signal Z[N] without high frequency noise is generated. A detailed description of the de-noise method is described below.

Figure 5:
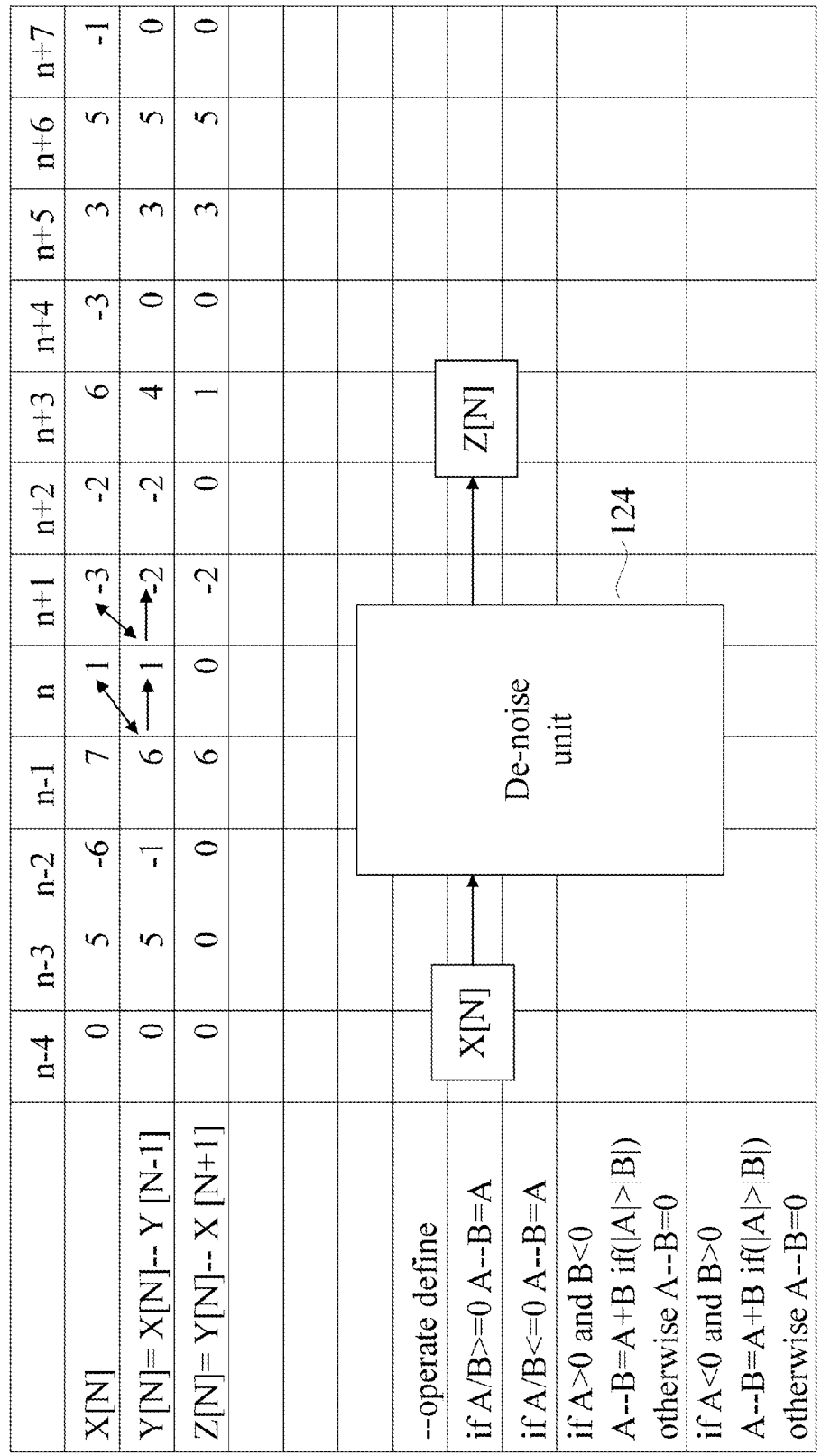
FIG. 5 is a diagram illustrating an embodiment of the de-noise method of the de-noise unit.

FIG. 5 is a diagram illustrating an embodiment of the de-noise method of the de-noise unit. First of all, two equations are defined as following:

$$Y[N]=X[N]--Y[N-1],$$

$$Z[N]=Y[N]--X[N+1],$$

where X[N] is the differentiated signal at sampling time N, Z[N] is the de-noise signal at sampling time N, and Y[N] is a buffer signal. The operator symbol "- -" is defined as follows: when both of a first operand A and a second operand B are larger than or equal to zero or both of the first operand A and the second operand B are smaller than zero, then A- -B=A; when the first operand A is larger than zero and the second operand B is smaller than zero, and |A|>|B|, then A- -B=A+B, otherwise A- -B=0; and when the first operand A is smaller than zero and the second operand B is larger than zero, and |A|>|B|, then A- -B=A+B, otherwise A- -B=0. The numbers in the table of FIG. 5 is an example of the embodiment of the de-noise method of the de-noise unit.

Figure 6:
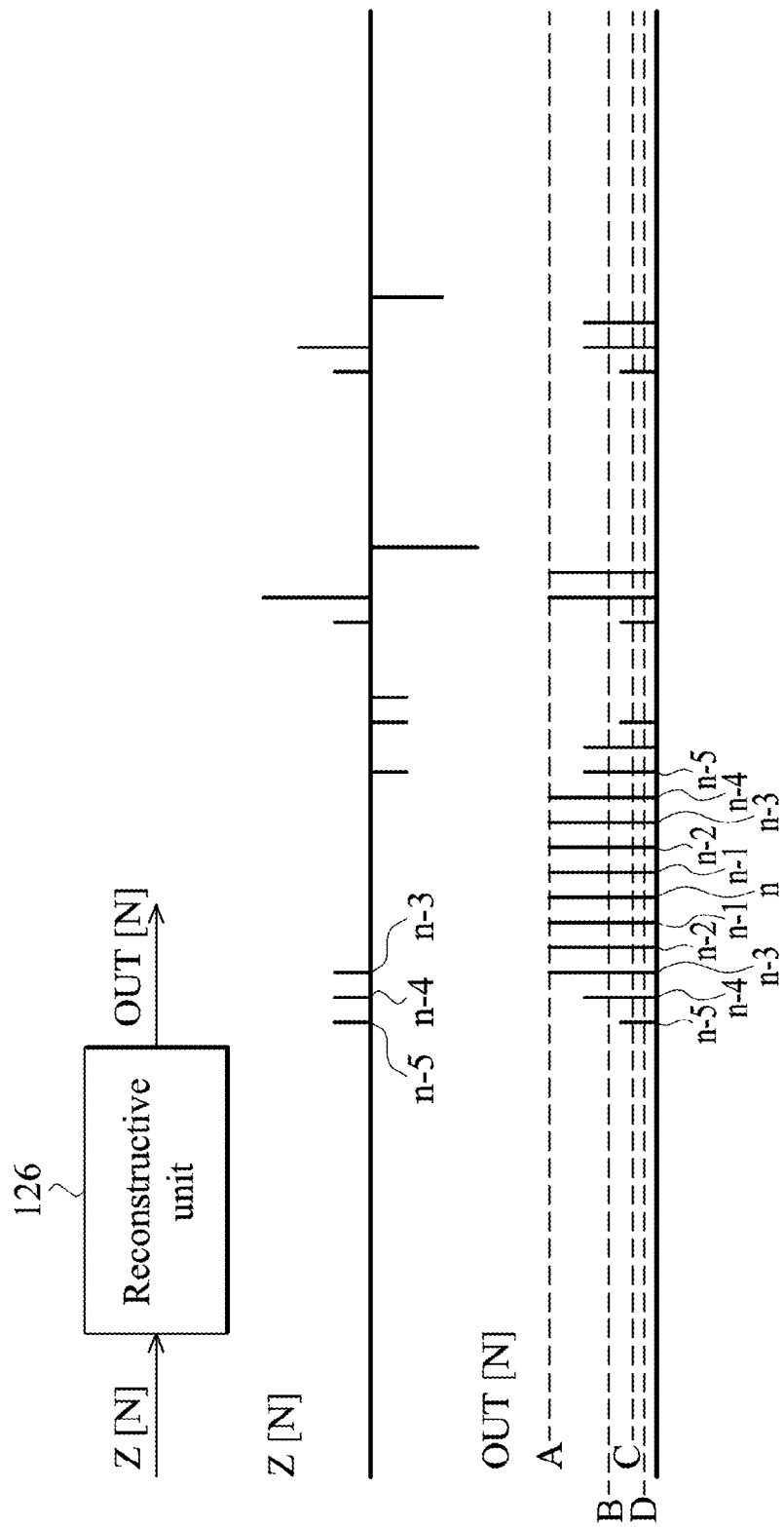
FIG. 6 is a diagram illustrating a digital input waveform and a digital output waveform of the reconstructive unit according to a reconstructive method of the reconstructive unit.

FIG. 6 is a diagram illustrating a digital input waveform and a digital output waveform of the reconstructive unit according to a reconstructive method of the reconstructive unit. The concept of the method is when a sample of the output signal is larger than the first threshold and smaller than the second threshold, the IIR equation is applied to generate a sample of the output signal; otherwise the FIR equation is applied to generate samples of the output signal. When a sample of the output signal is larger than the first threshold, it means that a touch behavior is sensed so that the IIR method is used to figure out the samples of the output signal. Relatively, when a sample of the output signal is smaller than the second threshold, it means that a touch behavior is not sensed and the FIR equation is used to detect the samples of the output signal. The IIR equation is defined as follows: OUT[N]=OUT[N−1]+Z[N], where X[N] is the de-noise signal at sampling time N, and OUT[N] is the output signal at sampling time N. The FIR equation is defined as follows: OUT[N]=Z[N]+Z[N−1]+Z[N−2]+ . . . Z[N−n], where n is order of the FIR equation, Z[N] is the de-noise signal at sampling time N, and OUT[N] is the output signal at sampling time N. In the embodiment of the invention, the order n of the FIR equation is 2, but is not limited thereto. The first threshold and the second threshold can be changeable or adjustable in the embodiment. In this manner, the output sample of the reconstructive unit can also be limited within a proper range without distorting the touch-sensed signal. According to the first threshold, whether a touch behavior is being triggered or not may be detected by the filtering system. According to the second threshold, whether a touch behavior will be finished may be detected by the filtering system.

For example, as FIG. 6 shows, it is assumed that the first threshold and the second threshold both are equal to number B. Before sampling time n−5, the de-noise signal Z[N] is zero, and the output signal OUT[N] is also zero. At sampling time n−5, the output signal OUT[N] is 40 which is lower than the first threshold B so that the FIR equation is applied. At sampling time n−4, the output signal OUT[N] is 40 which is higher than the first threshold B. Hence, the IIR equation is applied at the next sample time n−3. At sampling time n+1, the output signal OUT[N] is 40 which is lower than the second threshold B so the FIR equation is applied at next sampling time. The above is merely exemplary and not limited thereto.

Figure 7:
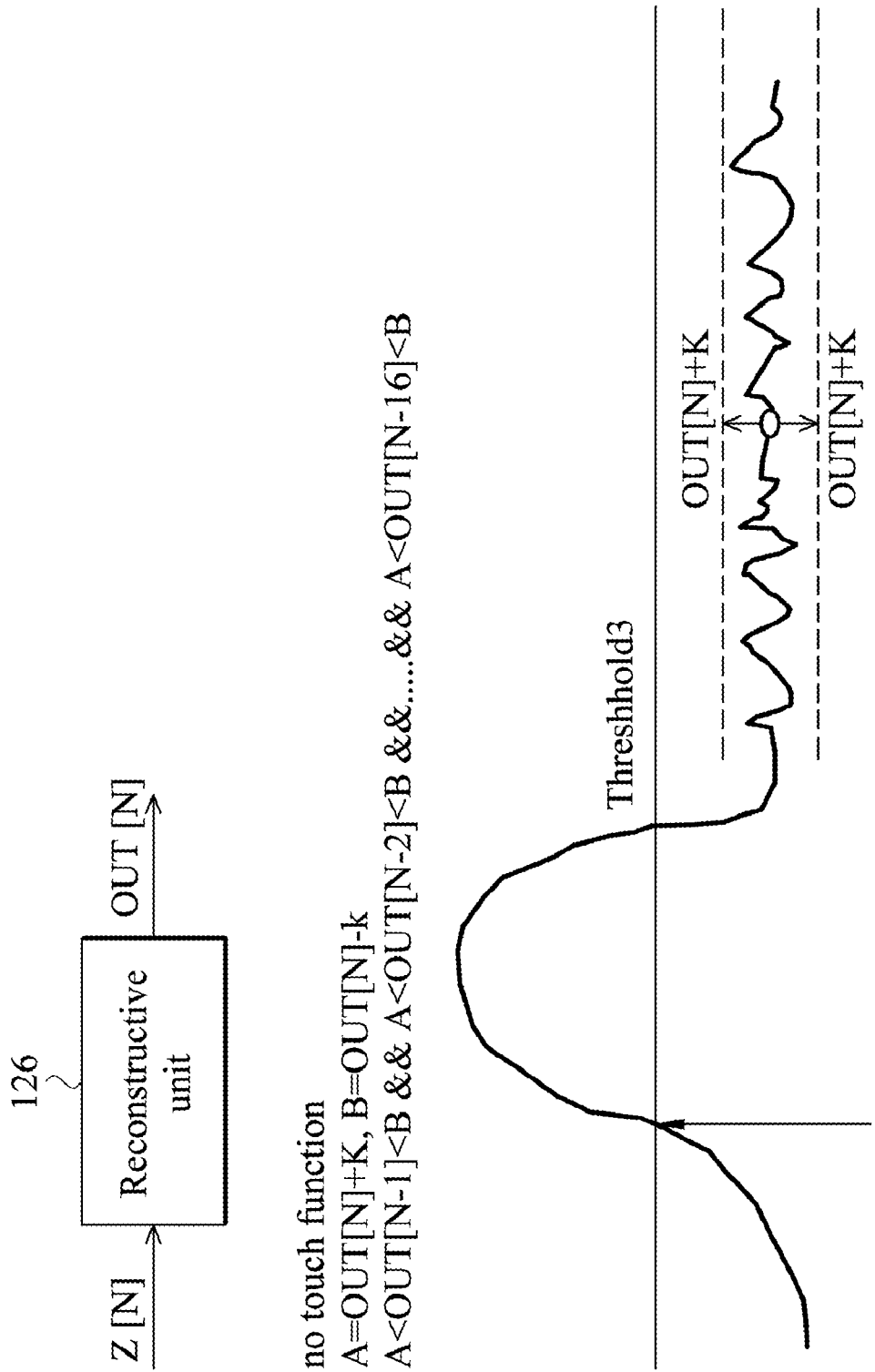
FIG. 7 is a diagram illustrating another reconstructive method of the reconstructive unit.

FIG. 7 is a diagram illustrating another reconstructive method of the reconstructive unit. The concept of the method is when a sample of the output signal is smaller than the third threshold and conforms to the no-touch function, the FIR equation is applied to generate samples of the output signal; otherwise the IIR equation is applied to generate samples of the output signal. The IIR equation is defined as follows: OUT[N]=OUT[N−1]+Z[N], where Z[N] is the de-noise signal at sampling time N, and OUT[N] is the output signal at sampling time N. The FIR equation is defined as follows: OUT[N]=Z[N]+Z[N−1]+Z[N−2]+ . . . Z[N−n], where n is order of the FIR equation, Z[N] is the de-noise signal at sampling time N, and OUT[N] is the output signal at sampling time N. The no-touch function is defined as follows: OUT[N]+k<OUT[N−1]<OUT[N]−k && OUT[N]+k<OUT[N−2]<OUT[N]−k && . . . && OUT[N]+k<OUT[N−M]<OUT[N]−k, where the OUT[N] is the output signal at sampling time N, k is a constant and M is the order of the no-touch function. The touch-sensed signals should be stable within a voltage range when there are no touch behaviors to trigger or affect touch-sensed signals. So according to the no-touch function, no further touch behaviors are triggered may be confirmed by the filtering system.

Figure 8:
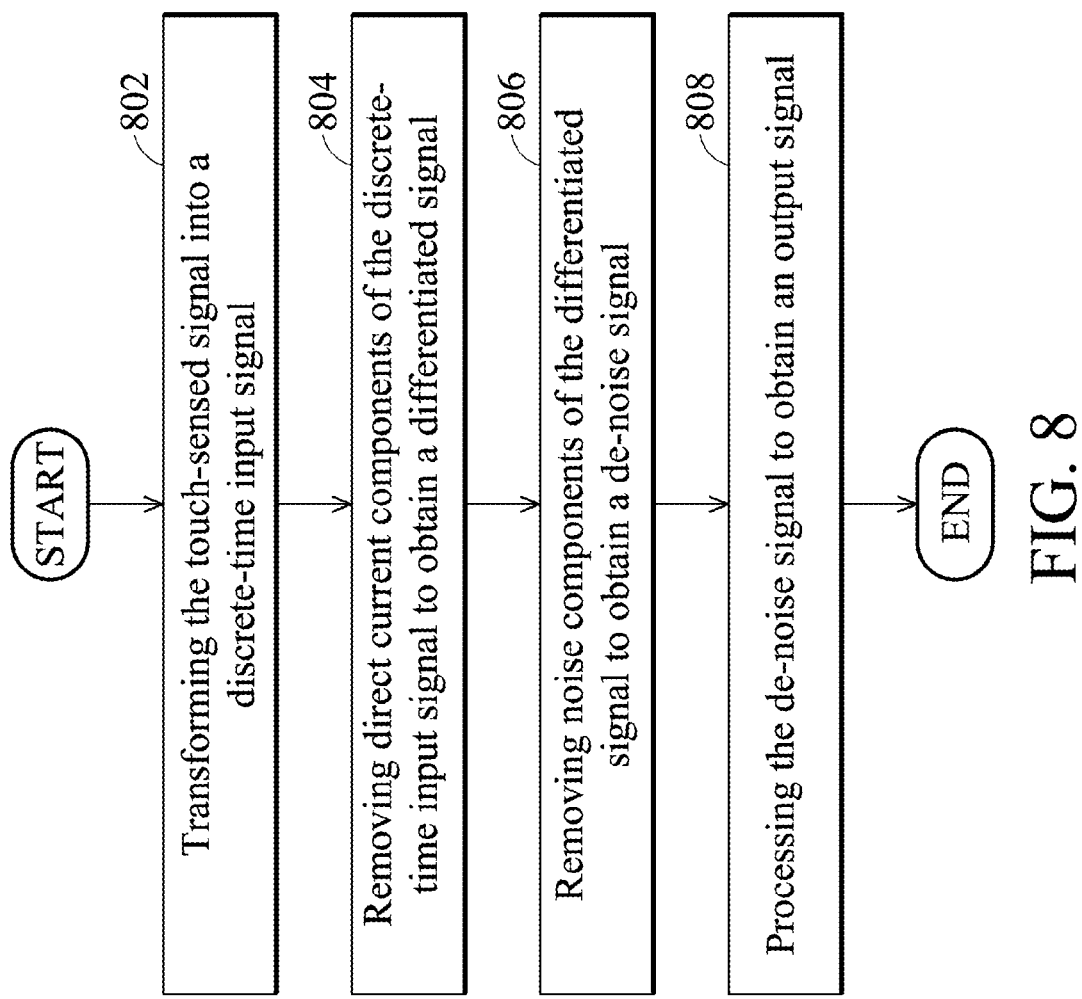
FIG. 8 is a flowchart illustrating a method for filtering according to an embodiment of the invention.

FIG. 8 is a flowchart illustrating a method for filtering according to an embodiment of the invention. In step 802, the touch-sensed signal is transformed into a discrete-time input signal by an analog to digital converter. In step 804, direct current components are removed from the discrete-time input signal to obtain a differentiated signal by a direct current removing unit. In step 806, noise components of the differentiated signal are removed to obtain a de-noise signal by a de-noise unit. In step 808, the de-noise signal is processed to obtain an output signal by a reconstructive unit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A filtering system, adapted to remove a direct current (DC) component and a high frequency noise component of a touch-sensed signal, comprising:
    an analog to digital converter for transforming the touch-sensed signal into a discrete-time input signal;
    a direct current removing unit for removing direct current components of the discrete-time input signal to obtain a differentiated signal;
    a de-noise unit for removing noise components of the differentiated signal to obtain a de-noise signal; and
    a reconstructive unit for processing the de-noise signal to obtain an output signal.

2. The filtering system as claimed in claim 1, wherein removing direct current components comprises:
    subtracting a previous sample of the input signal at a previous sampling time from a present sample of the input signal at a present sampling time.

3. The filtering system as claimed in claim 1, wherein removing noise components comprises:
    nullifying or shrinking a first sample of the differentiated signal at a current sampling time and a second sample of the differentiated signal at a following sampling time when the first sample is opposite to the second sample.

4. The filtering system as claimed in claim 1, wherein removing noise components comprises:
    obtaining samples of the de-glitch signal according to the following equations:

$$Y[N]=X[N]- -Y[N-1],$$

$$Z[N]=Y[N]- -X[N+1],$$

where $X[N]$ is the differentiated signal at sampling time N, and $Z[N]$ is the de-noise signal at sampling time N, and
    wherein the operator symbol "- -" is defined as following:
        when both of a first operand A and a second operand B are larger than or equal to zero or both of the first operand A and the second operand B are smaller than zero, then A- -B=A;
        when the first operand A is larger than zero and the second operand B is smaller than zero, and |A|>|B|, then A- -B=A+B, otherwise A- -B=0; and
        when the first operand A is smaller than zero and the second operand B is larger than zero, and |A|>|B|, then A- -B=A+B, otherwise A- -B=0.

5. The filtering system as claimed in claim 1, wherein rebuilding the de-noise signal comprises:
    obtaining samples of the output signal according to the de-noise signal, a first threshold value, a second threshold value, a FIR equation and an IIR equation.

6. The filtering system as claimed in claim 5, wherein when a sample of the output signal is larger than the first threshold and smaller than the second threshold, the IIR equation is applied to generate samples of the output signal, and when a sample of the output signal is not larger than the first threshold and/or not smaller than the second threshold, the FIR equation is applied to generate samples of the output signal.

7. The filtering system as claimed in claim 6, wherein the IIR equation is defined as following:

$$OUT[N]=OUT[N-1]+Z[N],$$

where $X[N]$ is the de-noise signal at sampling time N, and $OUT[N]$ is the output signal at sampling time N, and
    wherein the FIR equation is defined as following:

$$OUT[N]=Z[N]+Z[N-1]+Z[N-2]+ \ldots Z[N-n],$$

where n is order of the FIR equation, $Z[N]$ is the de-noise signal at sampling time N, and $OUT[N]$ is the output signal at sampling time N.

8. The filtering system as claimed in claim 1, wherein rebuilding the de-noise signal comprises:
    obtaining samples of the output signal according to the de-noise signal, a third threshold value, a no-touch function, a FIR equation and an IIR equation.

9. The filtering system as claimed in claim 8, wherein when a sample of the output signal is smaller than the third threshold and conforms to the no-touch function, the FIR equation is applied to generate samples of the output signal, and when a sample of the output signal is not smaller than the third threshold and/or does not conform to the no-touch function, the IIR equation is applied to generate samples of the output signal.

10. The filtering system as claimed in claim 9, wherein the IIR equation is defined as following:

$$OUT[N]=OUT[N-1]+Z[N],$$

where $Z[N]$ is the de-noise signal at sampling time N, and $OUT[N]$ is the output signal at sampling time N, and
    wherein the FIR equation is defined as following:

$$OUT[N]=Z[N]+Z[N-1]+Z[N-2]+ \ldots Z[N-n],$$

where n is order of the FIR equation, $Z[N]$ is the de-noise signal at sampling time N, and $OUT[N]$ is the output signal at sampling time N, and
    wherein the no-touch function is defined as following:

$$OUT[N]+k<OUT[N-1]<OUT[N]-k\&\&OUT[N]+k<OUT[N-2]<OUT[N]-k\&\& \ldots \&\&OUT[N]+k<OUT[N-M]<OUT[N]-k,$$

where the $OUT[N]$ is the output signal at sampling time N, k is a constant and M is the order of the no-touch function.

11. A method for filtering, adapted to remove a direct current (DC) component and a high frequency noise component of a touch-sensed signal, comprising:
    transforming the touch-sensed signal into a discrete-time input signal by an analog to digital converter;
    removing direct current components of the discrete-time input signal to obtain a differentiated signal by a direct current removing unit;
    removing noise components of the differentiated signal to obtain a de-noise signal by a de-noise unit; and
    processing the de-noise signal to obtain an output signal by a constructive unit.

12. The method as claimed in claim 11, wherein removing direct current components comprises:
    subtracting a previous sample of the input signal at a previous sampling time from a present sample of the input signal at a present sampling time.

13. The method as claimed in claim 11, wherein removing noise components comprises:
    nullifying or shrinking a first sample of the differentiated signal at a current sampling time and a second sample of the differentiated signal at a following sampling time when the first sample is opposite to the second sample.

14. The method as claimed in claim 11, wherein removing noise components comprises:
obtaining samples of the de-glitch signal according to the following equations:

$$Y[N]=X[N]\text{- -}Y[N-1],$$

$$Z[N]=Y[N]\text{- -}X[N+1],$$

where X[N] is the differentiated signal at sampling time N, and Z[N] is the de-noise signal at sampling time N, and wherein the operator symbol "- -" is defined as following:
when both of a first operand A and a second operand B are larger than or equal to zero or both of the first operand A and the second operand B are smaller than zero, then A- -B=A;
when the first operand A is larger than zero and the second operand B is smaller than zero, and |A|>|B|, then A- -B=A+B, otherwise A- -B=0; and
when the first operand A is smaller than zero and the second operand B is larger than zero, and |A|>|B|, then A- -B=A+B, otherwise A- -B=0.

15. The filter as claimed in claim 11, wherein rebuilding the de-noise signal comprises:
obtaining samples of the output signal according to the de-noise signal, a first threshold value, a second threshold value, a FIR equation and a IIR equation.

16. The filter as claimed in claim 15, wherein when a sample of the output signal is larger than the first threshold and smaller than the second threshold, the IIR equation is applied to generate samples of the output signal, and when a sample of the output signal is not larger than the first threshold and/or not smaller than the second threshold, the FIR equation is applied to generate samples of the output signal.

17. The filter as claimed in claim 16, wherein the IIR equation is defined as following:

$$OUT[N]=OUT[N-1]+Z[N],$$

where X[N] is the de-noise signal at sampling time N, and OUT[N] is the output signal at sampling time N, and wherein the FIR equation is defined as following:

$$OUT[N]=Z[N]+Z[N-1]+Z[N-2]+\ldots Z[N-n],$$

where n is order of the FIR equation, Z[N] is the de-noise signal at sampling time N, and OUT[N] is the output signal at sampling time N.

18. The filter as claimed in claim 11, wherein rebuilding the de-noise signal comprises:
obtaining samples of the output signal according to the de-noise signal, a third threshold value, a no-touch function, a FIR equation and a IIR equation.

19. The filter as claimed in claim 18, wherein when a sample of the output signal is smaller than the third threshold and conforms to the no-touch function, the FIR equation is applied to generate samples of the output signal; and when a sample of the output signal is not smaller than the third threshold and/or does not conform to the no-touch function the IIR equation is applied to generate samples of the output signal.

20. The filter as claimed in claim 19, wherein the IIR equation is defined as following:

$$OUT[N]=OUT[N-1]+Z[N],$$

where Z[N] is the de-noise signal at sampling time N, and OUT[N] is the output signal at sampling time N,
wherein the FIR equation is defined as following:

$$OUT[N]=Z[N]+Z[N-1]+Z[N-2]+\ldots Z[N-n],$$

where n is order of the FIR equation, Z[N] is the de-noise signal at sampling time N, and OUT[N] is the output signal at sampling time N, and
wherein the no-touch function is defined as following:

$$OUT[N]+k<OUT[N-1]<OUT[N]-k\&\&OUT[N]+k<OUT[N-2]<OUT[N]-k\&\&\ldots\&\&OUT[N]+k<OUT[N-M]<OUT[N]-k,$$

where the OUT[N] is the output signal at sampling time N, k is a constant and M is the order of the no-touch function.

* * * * *